(12) United States Patent
Hishinuma et al.

(10) Patent No.: US 10,655,068 B2
(45) Date of Patent: May 19, 2020

(54) GAS METER SYSTEM AND HEATING VALUE DERIVATION METHOD

(71) Applicant: TOKYO GAS CO., Ltd., Minato-ku (JP)

(72) Inventors: Masakazu Hishinuma, Tokyo (JP); Kenchi Kobayashi, Tokyo (JP)

(73) Assignee: TOKYO GAS CO., Ltd., Minato-ku (JP)

( * ) Notice: Subject to any disclaimer, the term of this patent is extended or adjusted under 35 U.S.C. 154(b) by 139 days.

(21) Appl. No.: 15/567,455

(22) PCT Filed: Mar. 11, 2016

(86) PCT No.: PCT/JP2016/057792
§ 371 (c)(1),
(2) Date: Oct. 18, 2017

(87) PCT Pub. No.: WO2016/170871
PCT Pub. Date: Oct. 27, 2016

(65) Prior Publication Data
US 2018/0112872 A1    Apr. 26, 2018

(30) Foreign Application Priority Data
Apr. 23, 2015  (JP) .................... 2015-088778

(51) Int. Cl.
*C10G 1/00* (2006.01)
*G01F 15/06* (2006.01)
(Continued)

(52) U.S. Cl.
CPC ............. *C10G 1/008* (2013.01); *F23K 5/002* (2013.01); *F23N 5/00* (2013.01); *F23N 5/18* (2013.01);
(Continued)

(58) Field of Classification Search
CPC ..... G01F 1/00; G01F 1/34; G01F 1/66; G01F 3/22; G01F 15/04; G01F 15/06;
(Continued)

(56) References Cited

U.S. PATENT DOCUMENTS 7,274,996 B2    9/2007  Lapinski et al.
2005/0086012 A1*  4/2005  Lapinski ................. G01F 1/666
                                                         702/48
(Continued)

FOREIGN PATENT DOCUMENTS

CN    101063669 A    10/2007
CN    100472172 C     3/2009
(Continued)

OTHER PUBLICATIONS

Combined Chinese Office Action and Search Report dated Mar. 7, 2019 in Patent Application No. 201680023028.4 (with English translation and English translation of Categories of Cited Documents), citing documents AO—AR therein, 11 pages.
(Continued)

*Primary Examiner* — Bryan Bui
(74) *Attorney, Agent, or Firm* — Oblon, McClelland, Maier & Neustadt, L.L.P.

(57) ABSTRACT

A gas meter system includes a gas meter, a gas production plant, and a center device. The gas meter includes a sound velocity derivation unit configured to derive a sound velocity of a gas supplied to a demand place. The gas production plant includes: a gas production unit configured to produce the gas; and a gas characteristic identification unit configured to identify a gas characteristic representing a relationship between the sound velocity and a heating value of the gas based on an analysis result of a component of the gas produced by the gas production unit. The center device includes a gas heating value derivation unit configured to
(Continued)

derive the heating value of the gas passing through the gas meter based on the derived sound velocity of the gas, and on the gas characteristic identified by the gas characteristic identification unit of the gas production plant.

18 Claims, 12 Drawing Sheets

(51) Int. Cl.

| | | |
|---|---|---|
| *G01F 3/22* | (2006.01) | |
| *G01F 1/00* | (2006.01) | |
| *G01N 29/024* | (2006.01) | |
| *F23N 5/00* | (2006.01) | |
| *G01F 15/04* | (2006.01) | |
| *F23K 5/00* | (2006.01) | |
| *G01F 1/66* | (2006.01) | |
| *G06Q 50/06* | (2012.01) | |
| *F23N 5/18* | (2006.01) | |
| *G01F 1/34* | (2006.01) | |
| *G06F 19/00* | (2018.01) | |

(52) U.S. Cl.
 CPC ................. *G01F 1/00* (2013.01); *G01F 1/34* (2013.01); *G01F 1/66* (2013.01); *G01F 3/22* (2013.01); *G01F 15/04* (2013.01); *G01F 15/06* (2013.01); *G01N 29/024* (2013.01); *G06F 19/00* (2013.01); *G06Q 50/06* (2013.01); *F23N 2221/10* (2020.01)

(58) Field of Classification Search
 CPC .. C10G 1/008; F23N 5/00; F23N 5/18; G01N 29/024; G06F 19/00; F23K 5/002; G06Q 50/60
 See application file for complete search history.

(56) References Cited

U.S. PATENT DOCUMENTS

| | | | | |
|---|---|---|---|---|
| 2011/0012738 A1* | 1/2011 | Nakamura | ............... | F23N 5/184 340/632 |
| 2014/0260665 A1* | 9/2014 | Soreefan | ................... | G01F 1/20 73/861.21 |

FOREIGN PATENT DOCUMENTS

| | | |
|---|---|---|
| CN | 101487818 A | 7/2009 |
| CN | 101779103 A | 7/2010 |
| EP | 2 175 247 A1 | 4/2010 |
| JP | 2000-39425 A | 2/2000 |
| JP | 3611416 B2 | 1/2005 |
| JP | 4903573 B2 | 3/2012 |
| JP | 2013-210344 A | 10/2013 |
| JP | 5984457 B2 | 9/2016 |
| WO | 2005/042984 A2 | 5/2005 |

OTHER PUBLICATIONS

International Preliminary Report on Patentability and Written Opinion dated Nov. 2, 2017 in PCT/JP2016/057792 filed Mar. 11, 2016 (English translation only).
European Search Report dated Mar. 12, 2018 in Patent Application No. 16782893.8.
Office Action dated Mar. 26, 2018 in European Patent Application No. 16 782 893.8.
International Search Report dated Apr. 26, 2016 in PCT/JP2016/057792, filed on Mar. 11, 2016.

\* cited by examiner

GAS METER SYSTEM AND HEATING VALUE DERIVATION METHOD

TECHNICAL FIELD

The present invention relates to a gas meter system and a heating value derivation method for deriving a heating volume of a gas.

BACKGROUND ART

In order for a gas utility to know a passage volume of a hydrocarbon gas consumed by a customer, the gas utility arranges a gas meter at a demand place to charge fees based on the passage volume of the gas, which is measured by the gas meter. In this case, when the gas supplied to the demand place has a constant heating value per unit volume, a passage heating value of the gas that has passed through the gas meter, that is, a gross heating value of the gas consumed by the customer can be accurately derived based on the passage volume of the gas. Therefore, the fees can be appropriately charged.

However, gases having different heating values may be supplied to the demand place depending on time and location. In such a case, it is difficult for a related-art gas meter configured to measure only the passage volume of the gas to accurately derive the passage heating value based on a usage amount of the gas, and fees may not be appropriately charged.

In view of this, there has been proposed a gas meter configured to, on the assumption that the gas to be supplied to the demand place is a hydrocarbon gas, measure a temperature and a sound velocity of the gas, estimate the heating value in a standard state of the gas based on the measured temperature and sound velocity, and derive the passage heating value based on the estimated heating value in the standard state, the passage volume of the gas, and the temperature of the gas (for example, Patent Literature 1).

CITATION LIST

Patent Literature

[PTL 1] Japanese Patent Application Laid-Open No. 2013-210344

SUMMARY OF INVENTION

Technical Problem

Incidentally, the gas meter of Patent Literature 1 described above presupposes that the gas to be supplied is only a hydrocarbon gas. Therefore, there has been a problem in that, when miscellaneous gases such as nitrogen, carbon dioxide, oxygen, and water (moisture) are mixed in the hydrocarbon gas, the temperature or the sound velocity fluctuates to inhibit the heating value of the gas from being derived with high accuracy.

The present invention has been made in view of the above-mentioned problem, and has an object to provide a gas meter system and a heating value derivation method that are capable of deriving a heating value of a gas with high accuracy.

Solution to Problem

In order to solve the above-mentioned problem, according to one embodiment of the present invention, there is provided a gas meter system including: a gas meter; a gas production plant; and a center device, the gas meter including a sound velocity derivation unit configured to derive a sound velocity of a gas supplied to a demand place, the gas production plant including: a gas production unit configured to produce the gas; and a gas characteristic identification unit configured to identify a gas characteristic representing a relationship between the sound velocity and a heating value of the gas based on an analysis result of a component of the gas produced by the gas production unit, the center device including a heating value derivation unit configured to derive the heating value of the gas used in the gas meter based on the sound velocity of the gas, which is derived by the sound velocity derivation unit of the gas meter, and on the gas characteristic identified by the gas characteristic identification unit.

Further, it is preferred that the embodiment include a plurality of gas production plants, that the center device further include a plant identification unit configured to identify, among the plurality of gas production plants, the gas production plant supplying the gas to the gas meter based on a time-series change of the sound velocity of the gas, which is derived by the sound velocity derivation unit of the gas meter, and that the heating value derivation unit be configured to derive the heating value of the gas used in the gas meter based on the sound velocity of the gas, which is derived by the sound velocity derivation unit of the gas meter, and on the gas characteristic of the gas production plant identified by the plant identification unit.

Further, it is preferred that the gas include a hydrocarbon gas.

Further, it is preferred that the gas meter further include a flow rate derivation unit configured to derive a flow rate of a gas passing through a gas flow path, and that the center device further include a passage heating value derivation unit configured to derive a passage heating value of the gas that has passed through the gas meter based on the heating value of the gas, which is identified by the heating value derivation unit, and on the flow rate of the gas, which is derived by the flow rate derivation unit of the gas meter.

Further, it is preferred that the gas meter further include a temperature sensor configured to measure a temperature of the gas flowing through the gas flow path, that the gas characteristic identification unit be configured to identify a gas characteristic representing a relationship among the temperature, the sound velocity, and the heating value of the gas based on the analysis result of the component of the gas produced by the gas production unit, and that the heating value derivation unit be configured to derive the heating value of the gas used in the gas meter based on the temperature of the gas, which is measured by the temperature sensor of the gas meter, on the sound velocity of the gas, which is derived by the sound velocity derivation unit of the gas meter, and on the gas characteristic identified by the gas characteristic identification unit of the gas production plant.

Further, it is preferred that the embodiment include a plurality of gas meters, and that the plant identification unit be configured to generate a gas supply map representing which of the plurality of gas production plants produces the gas supplied to each of the plurality of gas meters in a gas supply pipeline network in which the plurality of gas meters and the plurality of gas production plants are connected to each other based on the time-series change of the sound velocity of the gas, which is derived by the sound velocity derivation unit of the gas meter, to thereby identify the gas production plant supplying the gas to the gas meter based on the generated gas supply map.

Further, according to one embodiment of the present invention, there is provided a heating value derivation method for a gas meter system including a gas meter, a gas production plant, and a center device, the heating value derivation method including: deriving, by the gas meter, a sound velocity of a gas supplied to a demand place; producing the gas by the gas production plant; identifying, by the gas production plant, a gas characteristic representing a relationship between the sound velocity and a heating value of the gas based on an analysis result of a component of the produced gas; and deriving, by the center device, the heating value of the gas used in the gas meter based on the sound velocity of the gas, which is derived by the gas meter, and on the gas characteristic identified by the gas production plant.

Advantageous Effects of Invention

According to the present invention, it is possible to derive the heating value of the gas with high accuracy.

DESCRIPTION OF EMBODIMENTS

Figure 1:
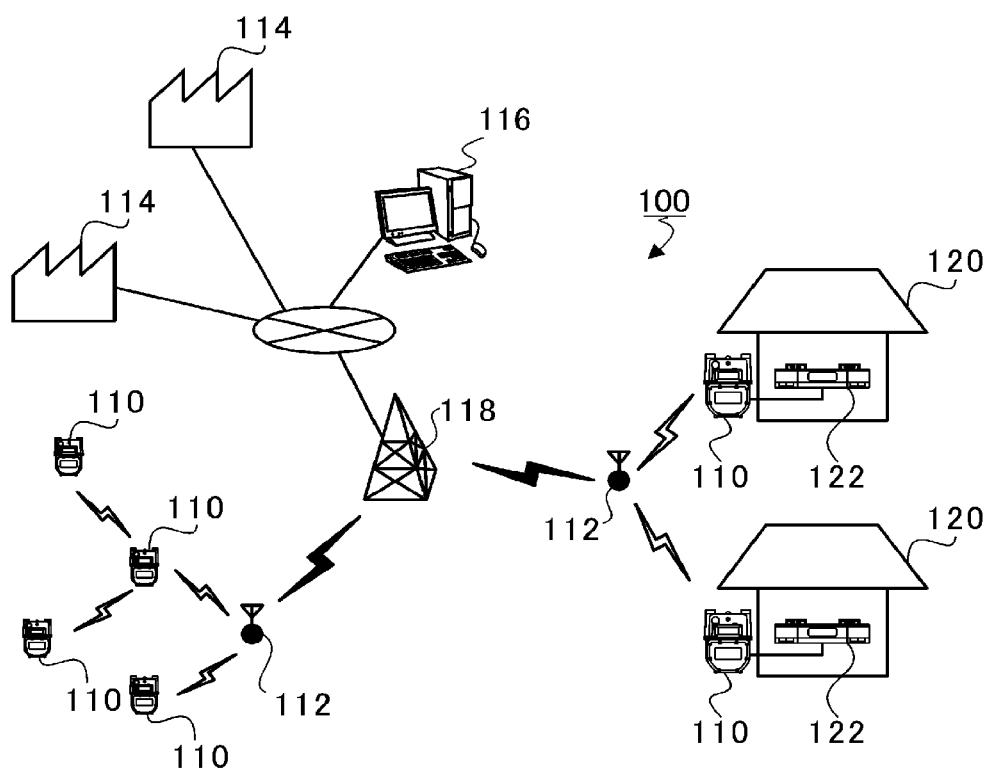
FIG. 1 is an explanatory diagram for illustrating a schematic configuration relating to information transmission of a gas meter system.

Now, with reference to the attached drawings, a preferred embodiment of the present invention is described in detail. The dimensions, materials, and other specific numerical values represented in the embodiment are merely examples used for facilitating the understanding of the invention, and do not limit the present invention otherwise particularly noted. Elements having substantially the same functions and configurations herein and in the drawings are denoted by the same reference symbols to omit redundant description thereof. Further, illustration of elements with no direct relationship to the present invention is omitted.

(Gas Meter System 100)

FIG. 1 is an explanatory diagram for illustrating a schematic configuration of a gas meter system 100 relating to information transmission. As illustrated in FIG. 1, the gas meter system 100 includes a plurality of gas meters 110, a plurality of gateway devices 112, a plurality of gas production plants 114, and a center device 116.

The gas meter 110 is configured to derive a sound velocity and a flow rate of a gas supplied to a demand place 120 of the gas meter 110, and to control a device 122 installed at the demand place 120 based on an instruction from the center device 116. The gateway device 112 is configured to collect data of one or a plurality of gas meters 110, and to distribute data to one or a plurality of gas meters 110.

The gas production plant 114 is configured to produce a gas to be supplied to the demand place 120, and to identify a gas characteristic representing a relationship among temperature, a sound velocity, and a heating value per unit volume (hereinafter also called "unit heating value") of the produced gas.

The center device 116 is constructed by, for example, a computer, and belongs to an administrator side of the gas meter system 100, for example, a gas utility. The center device 116 is configured to collect data of one or a plurality of gateway devices 112, and to distribute data to one or a plurality of gateway devices 112. Therefore, the center device 116 can collectively manage the information of the gas meter 110 arranged at any demand place 120.

In this case, between the gateway device 112 and the center device 116, wireless communication is executed through, for example, existing communication networks such as a mobile phone network and a personal handy-phone system (PHS) network including a base station 118. Further, between the gas meters 110 or between the gas meter 110 and the gateway device 112, wireless communication is executed through, for example, a smart meter wireless system (U-Bus Air) using a 920 MHz band.

Further, the center device 116 executes wired communication to/from the gas production plant 114 through the existing communication network to collect information (gas characteristics) of one or a plurality of gas production plants 114.

Figure 2:
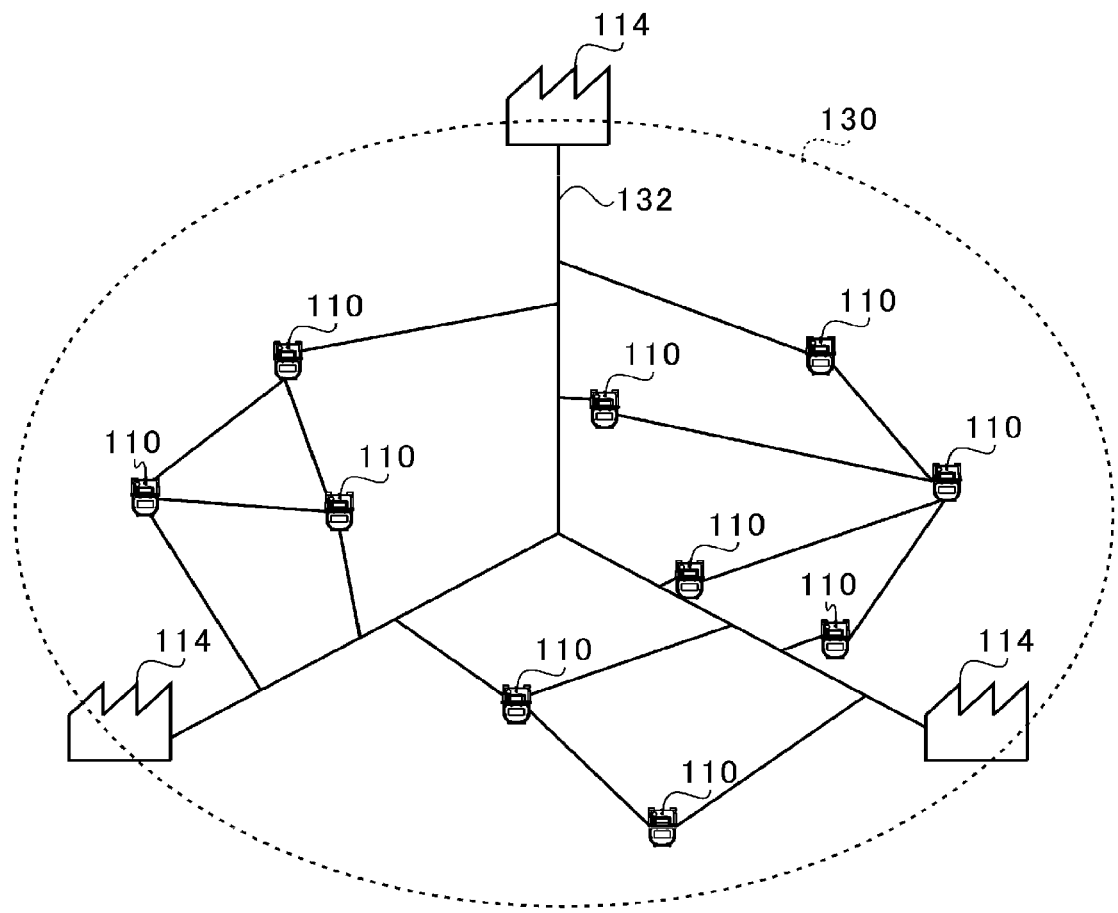
FIG. 2 is a diagram for illustrating a gas supply pipeline network.

FIG. 2 is a diagram for illustrating a gas supply pipeline network 130. As illustrated in FIG. 2, the gas supply pipeline network 130 includes gas supply pipes 132 spread out to the plurality of gas meters 110 and the plurality of gas production plants 114. In other words, the plurality of gas meters 110 and the plurality of gas production plants 114 are connected to one another via the gas supply pipeline network 130 (gas supply pipes 132).

The gases produced in the plurality of gas production plants 114 are supplied to the gas meters 110 through the gas supply pipes 132 forming the gas supply pipeline network 130. Therefore, the gas supply pipeline network 130 is supplied with the gases produced in the plurality of gas production plants 114. However, the movement of the gas due to gas transportation in the gas pipes is overwhelmingly faster than the diffusion of the gas in the gas pipes, and hence there is little mixture of the gases produced in the plurality of gas production plants 114.

Meanwhile, the gas meter 110 is supplied with, among the gases produced in the plurality of gas production plants 114, a gas produced in any one gas production plant 114. Further, even in the same gas meter 110, depending on time, a producer (gas production plant 114) of the gas to be supplied may vary, that is, the gas to be supplied may vary.

In such a gas meter 110, as described in detail later, when miscellaneous gases such as nitrogen, carbon dioxide, oxygen, and water (moisture) are not mixed in a hydrocarbon gas, the heating value per unit volume (hereinafter also called "unit heating value") of the gas can be derived with high accuracy based on the sound velocity of the gas. However, when the miscellaneous gases are mixed in the hydrocarbon gas, and the unit heating value of the gas is derived based on the sound velocity of the gas, the derivation accuracy of the unit heating value may be slightly reduced. In such a case, the gas utility may not be able to appropriately charge the fees.

In view of this, in the gas meter system 100 of this embodiment, with the configurations of the gas meter 110, the gas production plant 114, and the center device 116 that are described in detail below, the unit heating value of the gas passing through the gas meter 110 can be derived with high accuracy even when the miscellaneous gases are mixed in the hydrocarbon gas produced by the gas production plant 114.

(Gas Meter 110)

Figure 3:
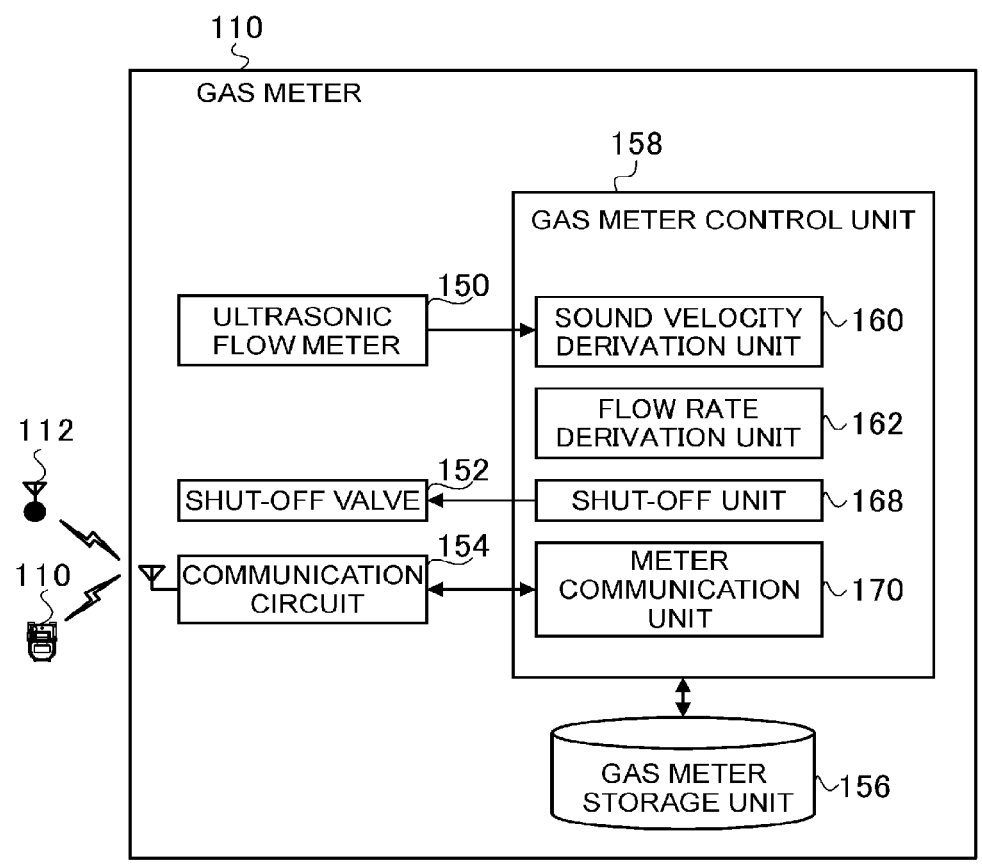
FIG. 3 is a functional block diagram for illustrating a schematic configuration of a gas meter.

FIG. 3 is a functional block diagram for illustrating a schematic configuration of the gas meter 110. The gas meter 110 includes an ultrasonic flow meter 150, a shut-off valve 152, a communication circuit 154, a gas meter storage unit 156, and a gas meter control unit 158.

Figure 4:
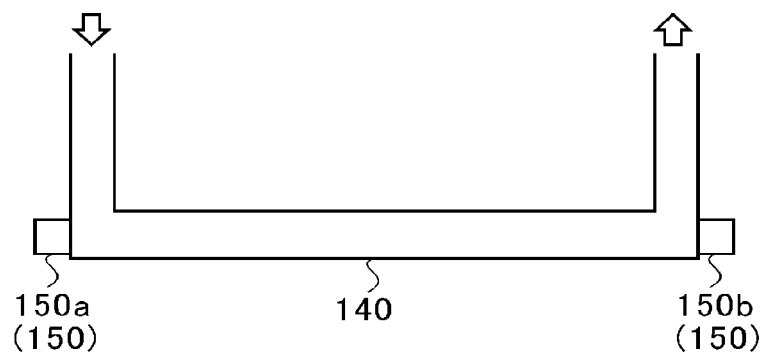
FIG. 4 is a diagram for illustrating a configuration of an ultrasonic flow meter.

FIG. 4 is a diagram for illustrating a configuration of the ultrasonic flow meter 150. The ultrasonic flow meter 150 is a flow meter using an arrival time difference, and, as illustrated in FIG. 4, includes a pair of ultrasonic transducers 150*a* and 150*b* arranged at two locations on the upstream and the downstream along the flow of the gas flowing through a gas flow path 140 (indicated by the outline arrows in FIG. 4). The ultrasonic flow meter 150 can bi-directionally measure, for each unit time period, a propagation time period in which an ultrasonic wave propagates in the gas from one ultrasonic transducer 150*a* or 150*b* to the other ultrasonic transducer 150*b* or 150*a*. Propagation time periods t1 and t2 are used in a sound velocity derivation unit 160 to be described later.

In this case, the pair of ultrasonic transducers 150*a* and 150*b* is arranged on the upstream side and the downstream side of the gas flow path 140, and hence the ultrasonic wave propagating therebetween is affected by a flow velocity of the gas. The ultrasonic wave propagating from the upstream side to the downstream side accelerates, and the ultrasonic wave propagating from the downstream side to the upstream side decelerates. In this case, the propagation time period of the ultrasonic wave propagating from the upstream ultrasonic transducer 150*a* to the downstream ultrasonic transducer 150*b* is represented by t1, and the propagation time period of the ultrasonic wave propagating from the downstream ultrasonic transducer 150*b* to the upstream ultrasonic transducer 150*a* is represented by t2.

Referring back to FIG. 3, the shut-off valve 152 is constructed by, for example, an electromagnetic valve using a solenoid or a stepping motor, and is configured to shut off or open a flow path of the gas. The communication circuit 154 is configured to establish wireless communication to/from the gateway device 112 and other gas meters 110. The gas meter storage unit 156 is constructed by, for example, a ROM, a RAM, a flash memory, or an HDD, and is configured to store programs and various types of data to be used in the gas meter 110.

The gas meter control unit 158 is constructed by a CPU or a DSP, and is configured to use the programs stored in the gas meter storage unit 156 to control the entire gas meter 110. Further, the gas meter control unit 158 functions as the sound velocity derivation unit 160, a flow rate derivation unit 162, a shut-off unit 164, and a meter communication unit 166.

The sound velocity derivation unit 160 is configured to derive the sound velocity based on the propagation time periods t1 and t2 measured by the ultrasonic flow meter 150. The flow rate derivation unit 162 is configured to derive the flow rate of the gas based on the propagation time periods t1 and t2 measured by the ultrasonic flow meter 150.

The shut-off unit 164 is configured to control the shut-off valve 152 to control supply and demand of the gas. The meter communication unit 166 is configured to exchange information with the center device 116 via the communication circuit 154, to thereby transmit, for example, information on the sound velocity derived by the sound velocity derivation unit 160 and the flow rate derived by the flow rate derivation unit 162 to the center device 116 for each hour. This embodiment holds true even in a configuration without the shut-off unit 164 or the shut-off valve 152.

Now, detailed processing of the sound velocity derivation unit 160 and the flow rate derivation unit 162 is described.

(Sound Velocity Derivation Unit 160)

Figure 5:
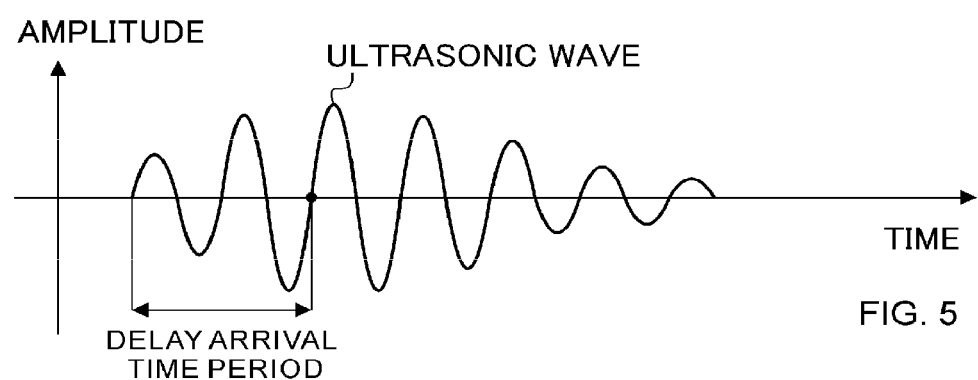
FIG. 5 is a diagram for illustrating a waveform of an ultrasonic wave received by an ultrasonic transducer of the ultrasonic flow meter.

FIG. 5 is a diagram for illustrating a waveform of an ultrasonic wave received by the ultrasonic transducer 150*a* or 150*b* of the ultrasonic flow meter 150. As illustrated in FIG. 5, the ultrasonic wave received by the ultrasonic transducer 150*a* or 150*b* of the ultrasonic flow meter 150 has a small amplitude immediately after start of the reception, and the amplitude is gradually increased to reach a peak after several waves. After that, the amplitude is decreased again. When the ultrasonic transducer 150*a* or 150*b* receives the ultrasonic wave transmitted from the paired ultrasonic transducer 150*b* or 150*a*, it is difficult for the ultrasonic transducer 150*a* or 150*b* to highly accurately define the arrival time period corresponding to the first several waves having a small amplitude due to the problems of sensitivity and an S/N ratio. Therefore, the ultrasonic transducer 150*a* or 150*b* determines that the ultrasonic wave is received when the ultrasonic wave that is increased to have a certain level of amplitude and detected after several waves crosses zero (indicated by the black dot in FIG. 5).

Therefore, in the ultrasonic flow meter 150, each of the propagation time periods t1 and t2 from the transmission to the reception of the ultrasonic wave is a time period that is longer than an original arrival time period by a delay arrival time period corresponding to about 2 wavelengths. That is, each of the propagation time periods t1 and t2 has an error corresponding to the delay arrival time period.

In general, the gas flow rate is derived based on the difference between the propagation time period t1 and the propagation time period t2. Therefore, even when each of the propagation time periods t1 and t2 has an error corresponding to the delay arrival time period with respect to the original arrival time period, the delay arrival time period can be cancelled by taking a difference between the propagation time period t1 and the propagation time period t2. Therefore, the derivation of the flow rate is less affected by the error.

Meanwhile, the sound velocity derivation unit 160 derives the sound velocity based on the propagation time periods t1 and t2 measured by the ultrasonic flow meter 150. Therefore, when there is an error corresponding to the delay arrival time period in each of the propagation time periods t1 and t2, the derivation of the sound velocity is affected by the error.

In view of this, the sound velocity derivation unit 160 subtracts the delay arrival time period being the error from each of the propagation time periods t1 and t2 measured by the ultrasonic flow meter 150 so as to derive arrival time periods ta1 and ta2 corresponding to the original arrival time periods, to thereby reduce the influence of the error as much as possible.

Then, the arrival time periods ta1 and ta2 corresponding to the original arrival time periods can be expressed by Expression (1).

$$ta1 = \frac{L}{C+V}, ta2 = \frac{L}{C-V} \quad (1)$$

In Expression (1), L represents a distance between the pair of ultrasonic transducers 150a and 150b, and V represents a flow velocity of the gas.

Therefore, the sound velocity derivation unit 160 derives the sound velocity C based on the arrival time periods ta1 and ta2 corresponding to the original arrival time periods with use of Expression (2) obtained by combining the equations of Expression (1).

$$C = \frac{L}{2}\left(\frac{1}{ta1} + \frac{1}{ta2}\right) \quad (2)$$

As described above, the sound velocity derivation unit 160 subtracts the delay arrival time period of the ultrasonic wave having a small amplitude and thus incapable of being detected from each of the propagation time periods t1 and t2 measured by the ultrasonic flow meter 150, and derives the sound velocity C based on the arrival time periods ta1 and ta2 corresponding to the original arrival time periods with use of Expression (2). In this manner, the sound velocity C can be derived with high accuracy. The delay arrival time period may be measured in advance through experiment for each of the sound velocity derivation units 160, or, when the sound velocity derivation units 160 having the same design are used, a standard delay arrival time period may be measured to omit measurement of each sound velocity derivation unit 160.

(Flow Rate Derivation Unit 162)

The flow rate derivation unit 162 derives the flow velocity V of the gas based on the propagation time periods t1 and t2 measured by the ultrasonic flow meter 150 with use of Expression (3).

$$V = \frac{L}{2}\left(\frac{1}{t1} - \frac{1}{t2}\right) \quad (3)$$

Then, the flow rate derivation unit 162 multiplies the derived flow velocity V of the gas by the cross-sectional area of the gas flow path, to thereby derive the flow rate of the gas.

(Gas Production Plant 114)

Figure 6:
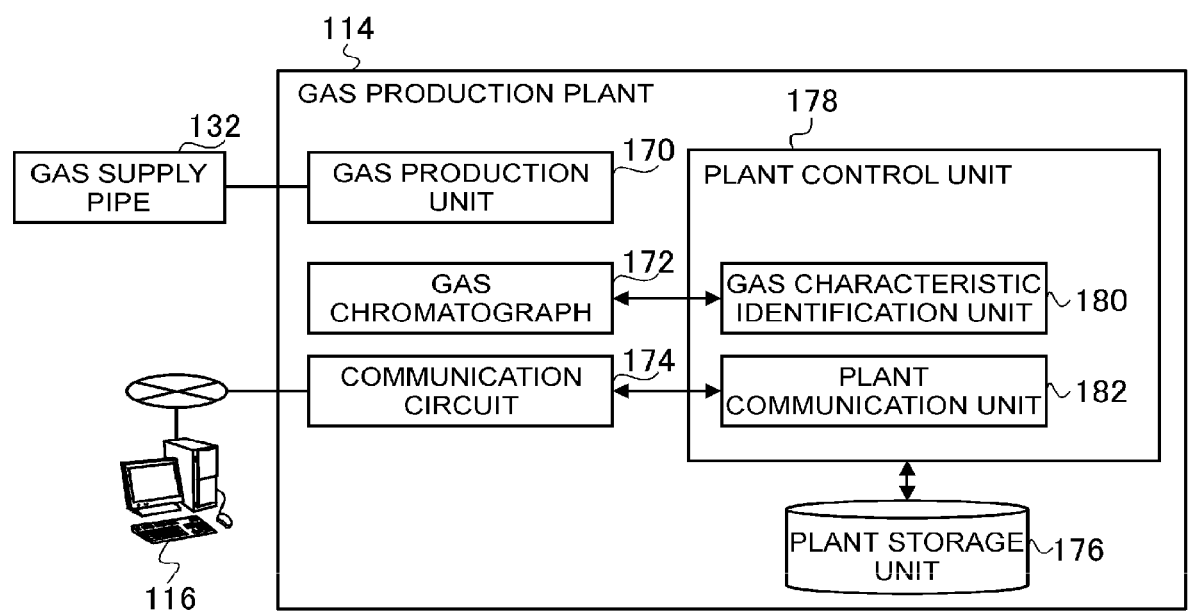
FIG. 6 is a functional block diagram for illustrating a schematic configuration of a gas production plant.

FIG. 6 is a functional block diagram for illustrating a schematic configuration of the gas production plant 114. As illustrated in FIG. 6, the gas production plant 114 includes a gas production unit 170, a gas chromatograph 172, a communication circuit 174, a plant storage unit 176, and a plant control unit 178.

The gas production unit 170 is configured to vaporize an LNG to produce a hydrocarbon gas, and to supply the gas to the gas supply pipes 132 (gas supply pipeline network 130). The gas chromatograph 172 is configured to analyze the component of the gas produced by the gas production unit 170 to be supplied to the gas supply pipeline network 130. The communication circuit 174 is configured to establish wired communication to/from the center device 116. The plant storage unit 176 is constructed by, for example, a ROM, a RAM, a flash memory, or an HDD, and is configured to store programs and various types of data to be used in the gas production plant 114.

The plant control unit 178 is constructed by a CPU or a DSP, and is configured to control the entire gas production plant 114 based on the program stored in the plant storage unit 176. Further, the plant control unit 178 functions as a gas characteristic identification unit 180 and a plant communication unit 182.

The gas characteristic identification unit 180 is configured to identify, as a gas characteristic, a relationship among the temperature, the sound velocity, and the unit heating value of the gas produced by the gas production unit 170 based on the component of the gas, which is analyzed by the gas chromatograph 172. Specifically, the gas characteristic is derived based on a percentage of the hydrocarbon gas in the whole component of the gas, which is analyzed by the gas chromatograph 172, and on the relationship of the unit heating value with respect to the temperature and the sound velocity of the hydrocarbon gas in the analyzed gas component. The relationship (gas characteristic) of the unit heating value with respect to the temperature and the sound velocity of the hydrocarbon gas is stored in advance in the plant storage unit 176. Further, the gas production plant 114 may include a sound velocity derivation unit configured to derive the sound velocity, and may derive the relationship (gas characteristic) of the unit heating value with respect to the sound velocity of the hydrocarbon gas based on the derived sound velocity.

Therefore, when miscellaneous gases are not mixed in the hydrocarbon gas produced by the gas production unit 170, the gas characteristic identification unit 180 directly reads out the gas characteristic of the hydrocarbon gas, which is stored in the plant storage unit 176. Meanwhile, when miscellaneous gases are mixed in the hydrocarbon gas produced by the gas production unit 170, the gas characteristic identification unit 180 derives a gas characteristic in which the percentage of the hydrocarbon gas is taken into account with respect to the gas characteristic of the hydrocarbon gas, which is stored in the plant storage unit 176.

The plant communication unit 182 is configured to exchange information with the center device 116 via the communication circuit 174 to transmit, as needed, the information on the gas characteristic identified by the gas characteristic identification unit 180 to the center device 116.

As described above, each gas production plant 114 transmits, as needed, the information on the gas characteristic of the gas transmitted to the gas supply pipeline network 130 to the center device 116 based on the analysis result of the component of the produced gas.

(Center Device 116)

Figure 7:
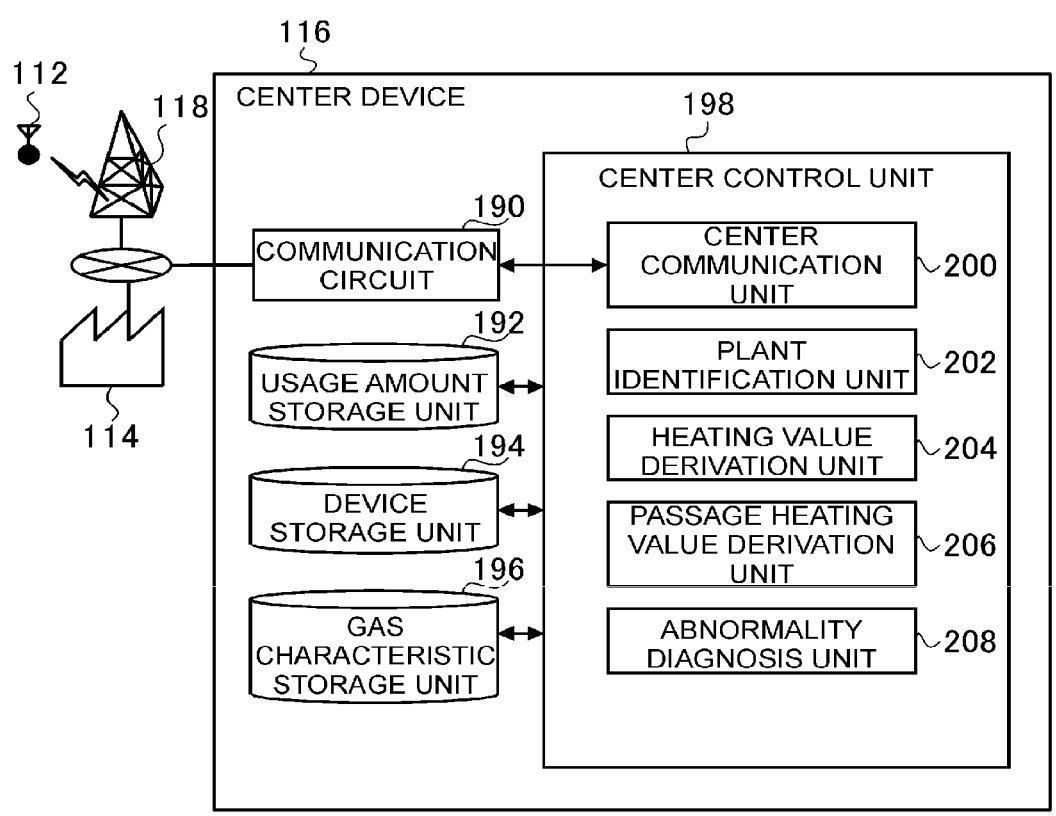
FIG. 7 is a functional block diagram for illustrating a schematic configuration of a center device.

FIG. 7 is a functional block diagram for illustrating a schematic configuration of the center device 116. As illustrated in FIG. 7, the center device 116 includes a communication circuit 190, a usage amount storage unit 192, a device storage unit 194, a gas characteristic storage unit 196, and a center control unit 198.

The communication circuit 190 is configured to establish wireless communication to/from the gateway device 112 via the base station 118, and to establish wired communication to/from the gas production plant 114. The usage amount storage unit 192 is constructed by, for example, a ROM, a RAM, a flash memory, or an HDD, and is configured to store the sound velocity and the flow rate of the gas, which are received from each gas meter 110, in association with the corresponding gas meter 110. Therefore, the usage amount storage unit 192 stores the transition of the sound velocity and the flow rate of the gas in the past for each gas meter 110. Similarly to the usage amount storage unit 192, the device storage unit 194 is constructed by, for example, a ROM, a RAM, a flash memory, or an HDD, and stores the device 122 to be used via the gas meter 110, for example, a pilot flame device, in association with the corresponding gas meter 110. Similarly to the usage amount storage unit 192, the gas characteristic storage unit 196 is constructed by, for example, a ROM, a RAM, a flash memory, or an HDD, and is configured to store the gas characteristic received from each gas production plant 114 in association with the corresponding gas production plant 114. Therefore, the gas characteristic storage unit 196 stores the transition of the gas characteristic in the past for each gas production plant 114.

The center control unit 198 is constructed by a CPU or a DSP, and is configured to control the entire center device 116 based on the information stored in the usage amount storage unit 192, the device storage unit 194, and the gas characteristic storage unit 196. Further, the center control unit 198 functions as a center communication unit 200, a plant identification unit 202, a heating value derivation unit 204, a passage heating value derivation unit 206, and an abnormality diagnosis unit 208.

The center communication unit 200 is configured to exchange information with each gas meter 110 via the communication circuit 190, to thereby, for example, receive the sound velocity and the flow rate of the gas from the gas meter 110. Further, the center communication unit 200 is configured to exchange information with each gas production plant 114 via the communication circuit 190, to thereby, for example, receive the gas characteristic from the gas production plant 114.

The plant identification unit 202 is configured to identify the producer of the gas supplied to the gas meter 110, that is, among the plurality of gas production plants 114, the gas production plant 114 producing the supplied gas based on the sound velocity itself or the time-series change of the sound velocity of the gas, which is received from the gas meter 110, and on the gas characteristic received from the gas production plant 114.

Figure 8A:
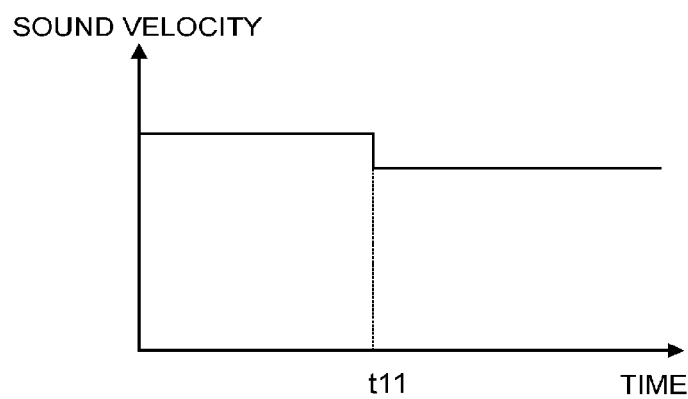
FIG. 8(a) and FIG. 8(b) are graphs for showing a time-series change of a sound velocity of a gas.
Figure 8B:
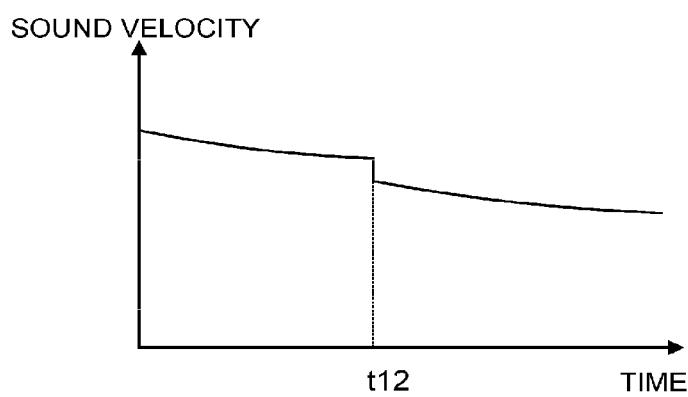

FIG. 8(a) is a graph for showing the change in sound velocity when a gas supplied to the gas meter 110 is changed while the temperature of the gas is constant, and FIG. 8(b) is a graph for showing the change in sound velocity when the gas supplied to the gas meter 110 is changed while the temperature of the gas is not constant.

As shown in FIG. 8(a), during a time period in which the temperature of the gas is constant and the gas supplied to the gas meter 110 is not changed (before a time t11 and after the time t11), the sound velocity is also constant. Then, when the supplied gas is changed at the time t11, that is, when the gas supplier (gas production plant 114) changes, the sound velocity of the gas also changes.

Further, as shown in FIG. 8(b), during a time period in which the temperature of the gas is not constant and the gas supplied to the gas meter 110 is not changed (before a time t12 and after the time t12), the sound velocity of the gas also changes in accordance with the temperature of the gas. Then, when the supplied gas is changed at the time t12, that is, when the gas supplier (gas production plant 114) changes, the sound velocity of the gas changes abruptly (in a stepwise manner) as compared to the case in which the sound velocity changes in accordance with the temperature of the gas.

That is, as shown in FIG. 8(a) and FIG. 8(b), regardless of whether or not the temperature of the gas is constant, when the supplied gas is changed, the sound velocity of the gas also changes abruptly.

In view of this, the plant identification unit 202 determines that the supplied gas is changed based on the time-series change of the sound velocity of the gas, which is received from the gas meter 110. More specifically, the plant identification unit 202 derives the differential value of the sound velocity of the gas, and determines that the supplied gas is changed when the derived differential value is equal to or larger than a predetermined threshold value indicating the change of the supplier of the gas.

In this case, the plant identification unit 202 monitors in time series to which gas meter 110 the gas produced in the gas production plant 114 is supplied in the gas supply pipeline network 130, to thereby generate a gas supply map representing which gas meter 110 is supplied with a gas produced in which gas production plant 114. Then, when the plant identification unit 202 determines that a gas supplied to one gas meter 110 is changed, the plant identification unit 202 refers to the gas supply map to identify which gas production plant 114 produces the gas supplied to the gas meter 110.

Figure 9A:
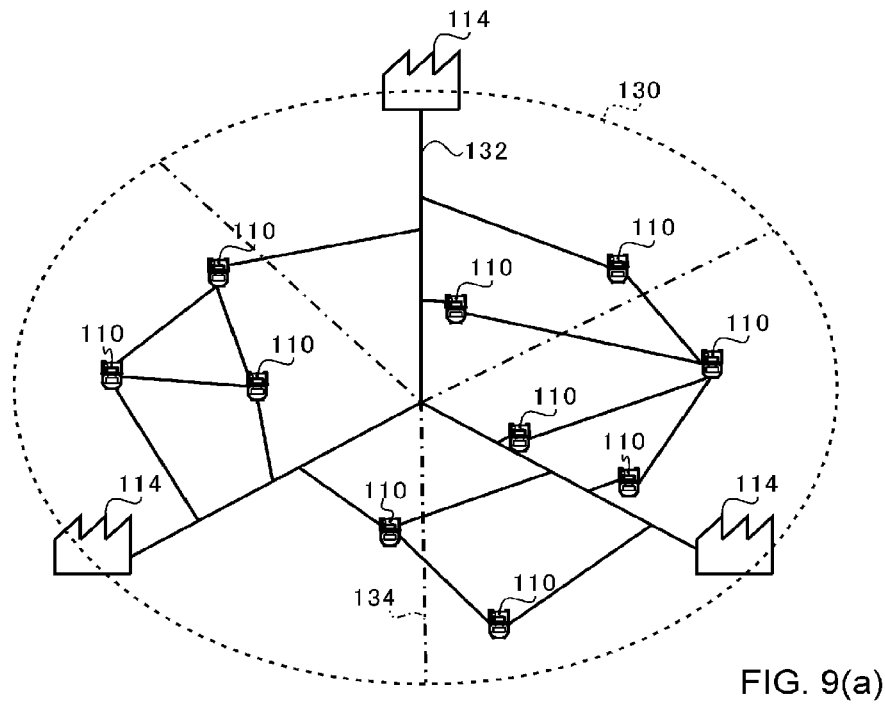
FIG. 9(a) and FIG. 9(b) are diagrams for illustrating a gas supply map.
Figure 9B:
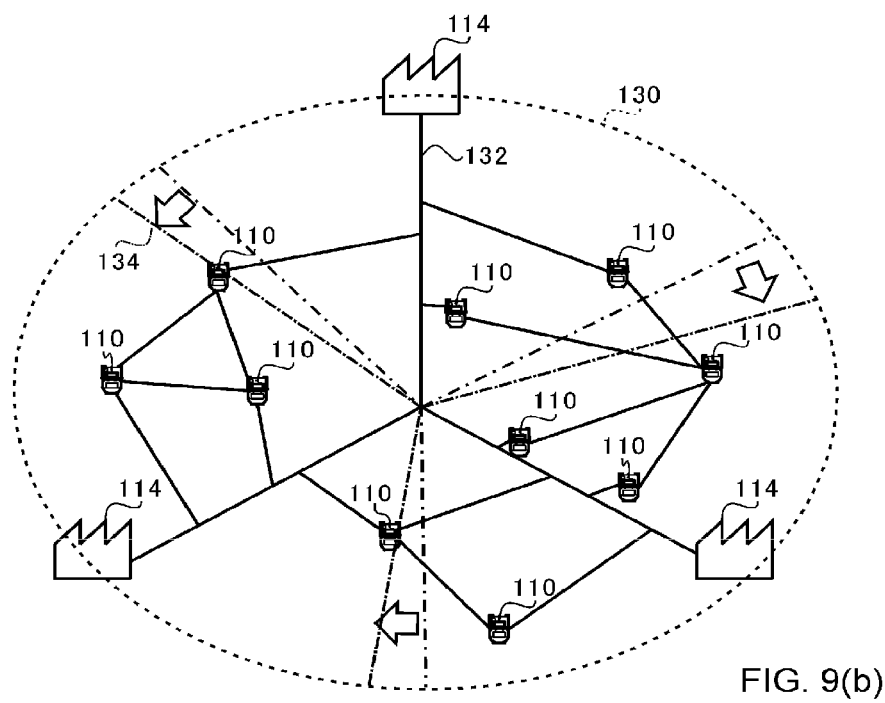

FIG. 9(a) and FIG. 9(b) are diagrams for illustrating the gas supply map. In this case, as described above, in the gas supply pipeline network 130, the plurality of gas meters 110 are arranged, and gases produced in the plurality of gas production plants 114 are supplied to each gas meter 110 in a mixed state.

For example, as illustrated in FIG. 9(a), it is assumed that, in the gas supply pipeline network 130, boundaries 134 serve as borders for supplying the gases produced in the respective gas production plants 114 to the gas meters 110 (demand places). Then, as illustrated in FIG. 9(b), in the gas supply pipeline network 130, as the supply range of the gas produced in each gas production plant 114 changes as time elapses, the boundaries 134 change as well. Then, when the sound velocity of the gas, which is derived in the gas meter 110, abruptly changes, the plant identification unit 202 identifies the change of the boundaries 134 based on the sound velocity of the gas in each of the plurality of gas meters 110, to thereby update the gas supply map.

As described above, the plant identification unit 202 monitors in time series the sound velocity of the gas, which is derived by each of the plurality of gas meters 110, to thereby determine the timing of the abrupt change of the sound velocity of the gas, which is derived by each of the plurality of gas meters 110. In this manner, the plant identification unit 202 determines which gas meter 110 is supplied with a gas produced in which gas production plant 114, to thereby update the gas supply map. That is, the gas supply map may be said to represent the range in which the gas produced in each gas production plant 114 is supplied in the gas supply pipeline network 130.

The heating value derivation unit 204 is configured to, when the gas production plant 114 producing the gas supplied to the gas meter 110 is identified, derive the unit heating value of the gas based on the gas characteristic of the identified gas production plant 114 and on the sound velocity received from the gas meter 110.

Figure 10:
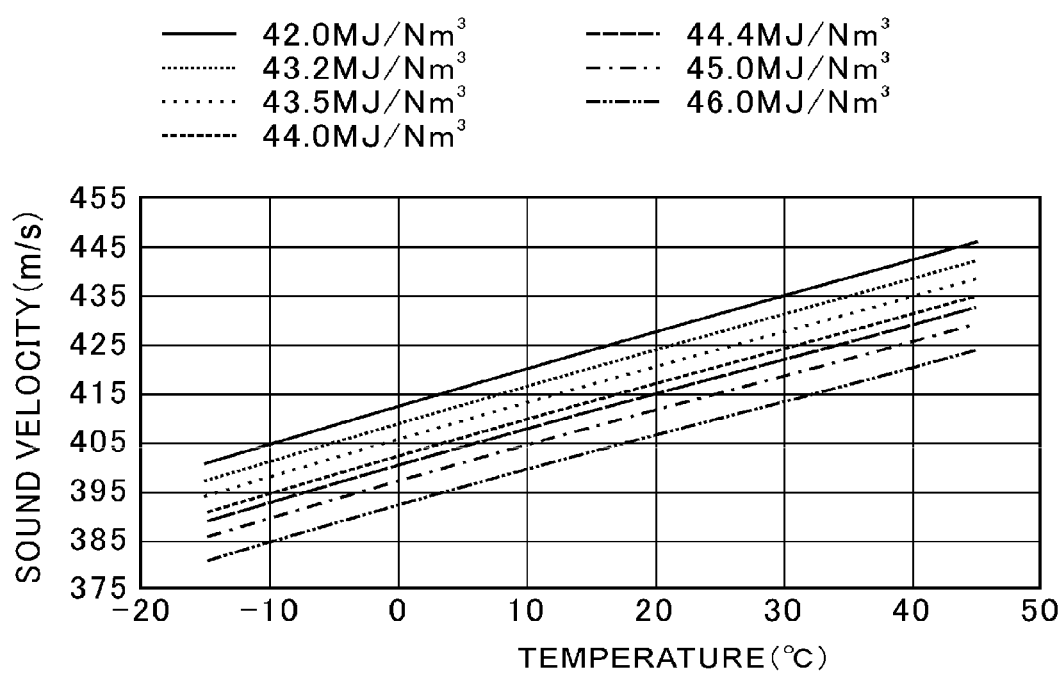
FIG. 10 is a graph for showing a relationship among temperature, the sound velocity, and a heating value of the gas.
Figure 11:
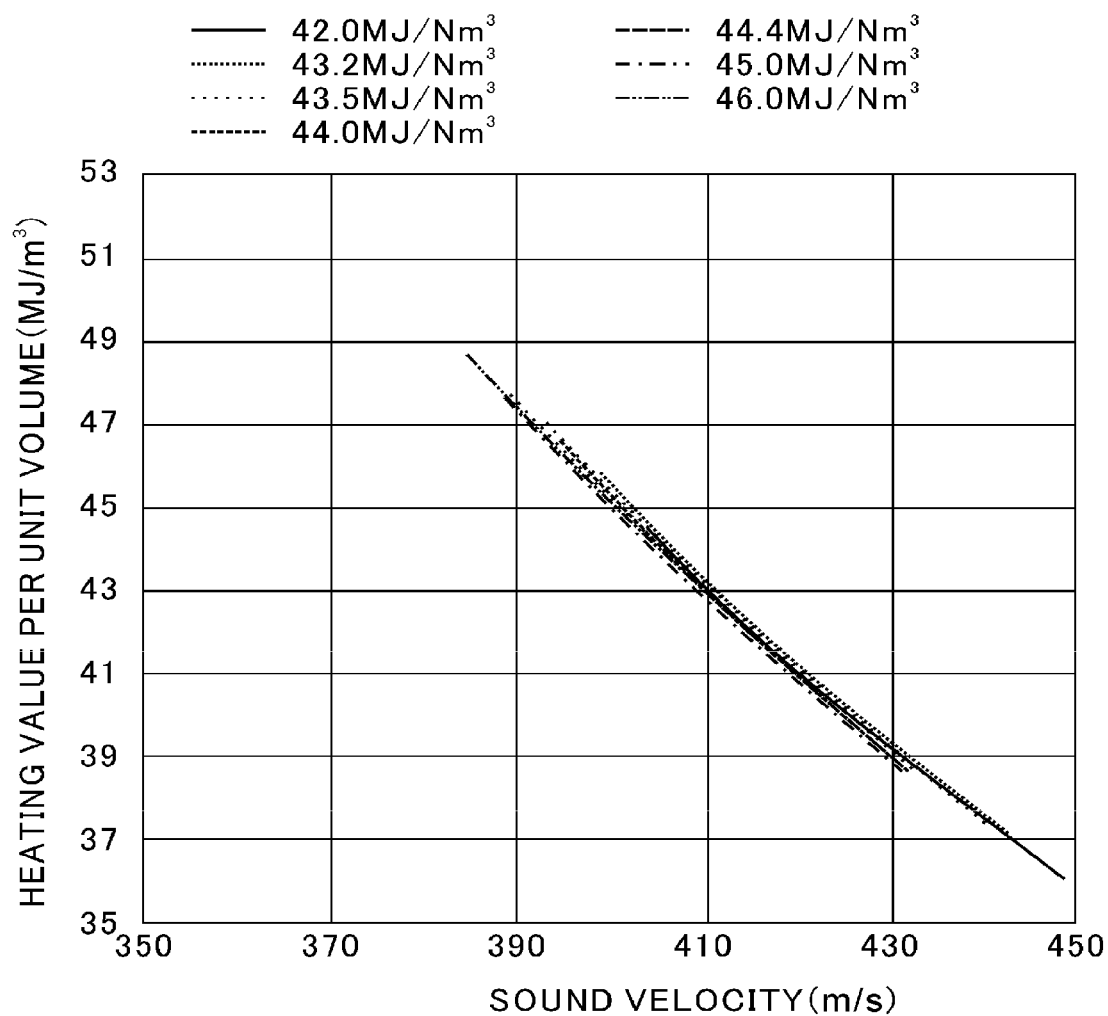
FIG. 11 is a graph for showing a relationship between the sound velocity and a unit heating value.

FIG. 10 is a graph for showing a relationship among temperature, a sound velocity, and a type (heating value in a standard state) of a gas. FIG. 11 is a graph for showing a relationship between the sound velocity and the unit heating value. In the following, the heating value in the standard state is also called "standard heating value".

In this case, as shown in FIG. 10, regardless of the type (standard heating value) of the hydrocarbon gas, the sound velocity of the gas is decreased as the temperature of the gas is decreased, and the sound velocity of the gas is increased as the temperature of the gas is increased. Meanwhile, when the type (standard heating value) of the gas differs, the sound velocity of the gas differs even at the same gas temperature, and the temperature of the gas differs even at the same gas sound velocity. In more detail, as the standard heating value of the gas is increased, the sound velocity of the gas is decreased even at the same gas temperature, and the temperature of the gas is increased even at the same gas sound velocity.

In accordance with such characteristics, the type (standard heating value) of the gas can be estimated when the temperature and the sound velocity of the gas can be identified. For example, when the temperature of the gas is 20° C. and the sound velocity of the gas is 415 m/s, the type (standard heating value) of the gas can be estimated to be 44.4 MJ/Nm$^3$.

Incidentally, based on the relationship among the temperature, the sound velocity, and the type (standard heating value) of the gas shown in FIG. 10, temperatures and unit heating values of different types (standard heating values) of gas in the case of the same sound velocity of 405 m/s are shown in Table 1.

TABLE 1

| | Type of gas(MJ/Nm$^3$) | | | | | | |
|---|---|---|---|---|---|---|---|
| | 42.0 | 43.2 | 43.5 | 44.0 | 44.4 | 45.0 | 46.0 |
| Temperature(° C.) | −8.3 | −4.5 | 0.5 | 4.5 | 7.0 | 12.0 | 19.0 |
| Unit heating value(MJ/m$^3$) | 43.3 | 43.9 | 43.4 | 43.3 | 43.3 | 43.1 | 43.0 |

As is apparent from Table 1 as well, in the case of the same sound velocity of 405 m/s, regardless of the type (standard heating value) of the gas and the temperature, the unit heating value is a constant value that falls within the range of about 43.5±0.5 MJ/m$^3$.

Further, as shown in FIG. 11, regardless of the type (standard heating value) of the gas, the sound velocity and the unit heating value can be represented in a substantially collinear relationship. Therefore, it can be understood that, regardless of the type (standard heating value) of the gas, the unit heating value can be derived based on only the sound velocity. In Table 1 and FIG. 11, there is a slight error in the relationship between the sound velocity and the unit heating value depending on the type (standard heating value) of the gas, but the error is within about ±2.5%. Thus, the unit heating value can be derived with high accuracy with use of only the sound velocity regardless of the type of the gas.

Now, how the unit heating value can be derived based on only the sound velocity C is theoretically described.

The sound velocity C can be represented by Expression (4).

$$C = \sqrt{\frac{\gamma RT}{M}} \quad (4)$$

In Expression (4), γ represents a specific heat ratio of a gas mixture, R represents a gas constant (J/(mol·K)), and M represents an average molecular weight of a gas mixture (kg/mol).

Further, the relationship between a gas density (average molecular weight) and the standard heating value can be represented by Expression (5).

$$CV_0 = aM + b \quad (5)$$

In Expression (5), $CV_0$ represents a standard heating value (kJ/Nm$^3$), and a and b are constants (in the case of an ideal gas of saturated hydrocarbon, a=2.1×10$^6$ and b=7.4×10$^3$, and in the case of an actual gas of saturated hydrocarbon, a=2.4×10$^6$ and b=5.7×10$^2$).

Further, the unit heating value of the gas at a temperature T can be represented by Expression (6).

$$CV_T = \frac{pT_0}{p_0 T} CV_0 \quad (6)$$

In Expression (6), $CV_T$ represents a unit heating value (kJ/m$^3$) at the temperature T, p represents a pressure (supply pressure, Pa) at the temperature T, $p_0$ represents a standard pressure (101,325 Pa), and $T_0$ represents a standard temperature (273.15 K).

Expression (7) can be derived based on Expression (4) to Expression (6).

$$CV_T = \frac{1}{C^2} \frac{\gamma R T_0 p}{p_0} \left( a + \frac{b}{M} \right) \quad (7)$$

In Expression (7), M is from about 16 to about 20 in the case of a city gas, and thus the relationship of a>>b/M is satisfied. Therefore, Expression (7) can be represented as Expression (8).

$$CV_T = \frac{1}{C^2} \frac{a \gamma R T_0 p}{p_0} \quad (8)$$

As described above, Expression (8) is not affected by the temperature T during measurement. Therefore, it is understood that, when the supply pressure p is known, the unit heating value can be derived based on only the sound velocity C without measuring the temperature T. When the unit heating value is derived based on only the sound velocity C without measuring the temperature T, the unit heating value can be derived with higher accuracy to some extent in a case where the gas is a straight-chain saturated hydrocarbon gas. Further, it is known that the sound velocity is hardly affected by pressure, and hence the pressure p may be corrected as necessary based on the general Boyle's law by measuring the pressure.

Figure 12:
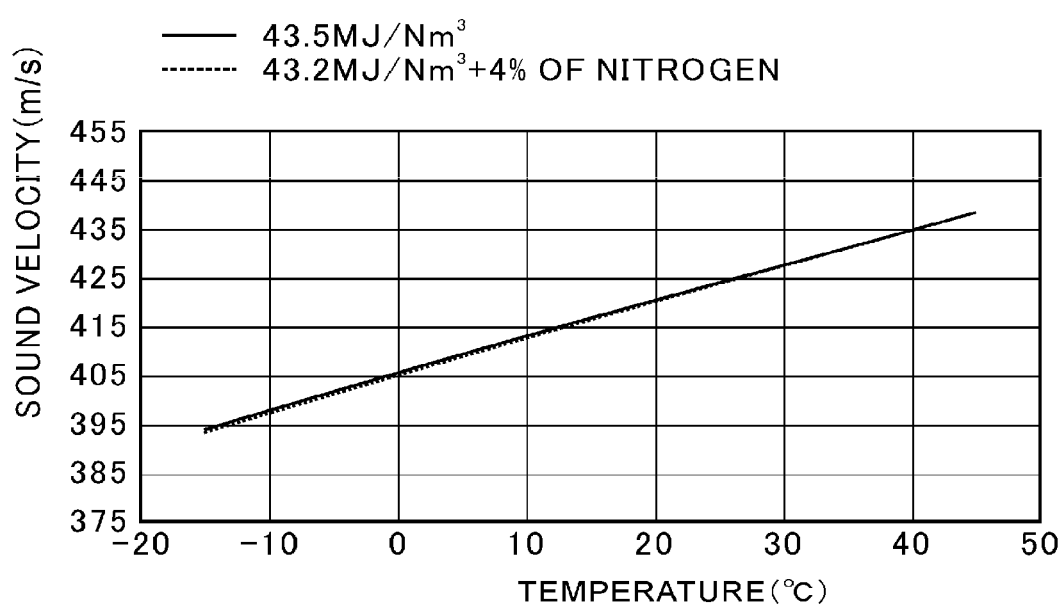
FIG. 12 is a graph for showing a relationship between the temperature and the sound velocity in a case of a hydrocarbon gas alone and a case in which nitrogen (miscellaneous gas) is mixed in the hydrocarbon gas.

FIG. 12 is a graph for showing a relationship between the temperature and the sound velocity in a case of the hydrocarbon gas alone and a case in which nitrogen (miscellaneous gas) is mixed in the hydrocarbon gas. As described above, when the gas supplied to the gas meter 110 is only a hydrocarbon gas, the unit heating value can be derived based on the sound velocity. However, as shown in FIG. 12, the relationship between the temperature and the sound velocity is represented to be substantially collinear between a case of a hydrocarbon gas having a standard heating value of 43.5

MJ/Nm³ alone and a case in which 4% of nitrogen is mixed in a hydrocarbon gas having a standard heating value of 43.2 MJ/Nm³. Therefore, when the unit heating value is derived based on the sound velocity in a case where nitrogen (miscellaneous gas) is mixed in the hydrocarbon gas, the derivation accuracy may be reduced. Specifically, when 1% of nitrogen (miscellaneous gas) is mixed in the hydrocarbon gas, the unit heating value may have an error of about 1.4% with respect to the case of the hydrocarbon gas alone.

In view of this, the heating value derivation unit 204 derives the unit heating value of the gas based on the sound velocity received from the gas meter 110 and on the gas characteristic received from the identified gas production plant 114. Even when the miscellaneous gas is mixed in the hydrocarbon gas, the gas characteristic received from the identified gas production plant 114 represents a unit heating value in which mixture of the miscellaneous gas is taken into account, and hence the heating value derivation unit 204 can derive the unit heating value of the gas in which the influence of the mixture of the miscellaneous gas is taken into account.

The passage heating value derivation unit 206 is configured to derive the passage heating value of the gas by integrating a product of the unit heating value of the gas, which is derived by the heating value derivation unit 204, and the flow rate received from the gas meter 110 with respect to a time axis.

The abnormality diagnosis unit 208 is configured to diagnose whether or not the present passage heating value is abnormal based on the transition of the passage heating value in the past, which is stored in the usage amount storage unit 192. Further, the abnormality diagnosis unit 208 can diagnose the abnormality also based on the rating passage heating value of the gas in the device 122, which is stored in the device storage unit 194.

As described above, the center device 116 (heating value derivation method) according to this embodiment can derive the heating value of the gas supplied to the gas meter 110 based on the sound velocity derived by the gas meter 110 and on the gas characteristic identified by the gas production plant 114. With this, even when miscellaneous gases are mixed in the hydrocarbon gas, the unit heating value of the gas supplied to the gas meter 110 can be derived with high accuracy. Further, the gas utility can appropriately charge fees based on the derived unit heating value of the gas.

Modification Example

Figure 13:
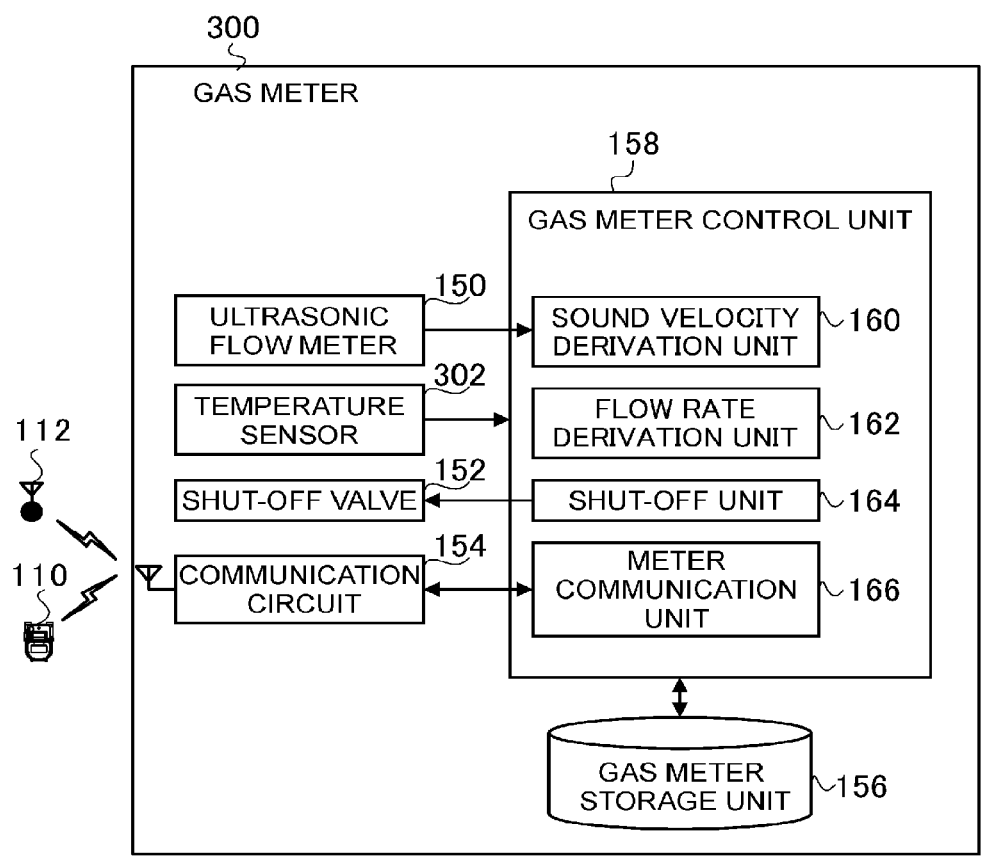
FIG. 13 is a functional block diagram for illustrating a schematic configuration of a gas meter according to a modification example of the present invention.

FIG. 13 is a functional block diagram for illustrating a schematic configuration of a gas meter 300 according to a modification example of the present invention. As illustrated in FIG. 13, the gas meter 300 differs from the above-mentioned gas meter 110 in that a temperature sensor 302 is provided. The remaining configuration is the same as that of the gas meter 110.

The temperature sensor 302 measures the temperature of the supplied gas. Then, the meter communication unit 166 transmits the sound velocity derived by the sound velocity derivation unit 160, the temperature measured by the temperature sensor 302, and the flow rate derived by the flow rate derivation unit 162 to the center device 116 for each hour.

In the center device 116, the heating value derivation unit 204 derives the unit heating value (MJ/m³) of the gas based on the sound velocity and the temperature that are received from the gas meter 110 and on the gas characteristic received from the gas production plant 114. With this, the center device 116 can derive the unit heating value of the gas with higher accuracy than that of the gas meter 110.

As described above, in a gas meter system including the gas meter 300, the gas meter 300 can derive or measure the temperature and the sound velocity of the gas, and the center device 116 can derive the unit heating value of the gas supplied to the gas meter 300 based on the temperature and the sound velocity of the gas. With this, the derivation accuracy of the unit heating value of the gas can be increased.

The preferred embodiment of the present invention has been described above with reference to the attached drawings, but, needless to say, the present invention is not limited to the embodiment. It is apparent that those skilled in the art may arrive at various alternations and modifications within the scope of claims, and those examples are construed as naturally falling within the technical scope of the present invention.

INDUSTRIAL APPLICABILITY

The present invention can be applied to a gas meter system and a heating value derivation method for deriving a unit heating value.

REFERENCE SIGNS LIST

100 gas meter system
110 gas meter
114 gas production plant
116 center device
150 ultrasonic flow meter
160 sound velocity derivation unit
162 flow rate derivation unit
170 gas production unit
180 gas characteristic identification unit
202 plant identification unit
204 heating value derivation unit
206 passage heating value derivation unit

The invention claimed is:
1. A gas meter system, comprising:
a gas meter;
a gas production plant; and
a center device, wherein
the gas meter includes a sound velocity derivation unit configured to derive a sound velocity of a gas supplied to a demand place,
the gas production plant includes:
a gas production unit configured to produce the gas;
a gas chromatograph configured to analyze a component of the gas produced by the gas production unit; and
a gas characteristic identification unit configured to identify a gas characteristic representing a relationship between the sound velocity and a heating value of the gas based on an analysis result of the component of the gas produced by the gas production unit, and
the center device includes a heating value derivation unit configured to derive the heating value of the gas used in the gas meter based on the sound velocity of the gas, which is derived by the sound velocity derivation unit of the gas meter, and on the gas characteristic identified by the gas characteristic identification unit.

2. A gas meter system according to claim 1, further comprising a plurality of the gas production plant, wherein the center device further comprises a plant identification unit configured to identify, among the plurality of the gas production plant, a gas production plant supplying the gas to the gas meter based on a time-series change of the sound velocity of the gas, which is derived by the sound velocity derivation unit of the gas meter, and wherein the heating value derivation unit is configured to derive the heating value of the gas used in the gas meter based on the sound velocity of the gas, which is derived by the sound velocity derivation unit of the gas meter, and on the gas characteristic of the gas production plant identified by the plant identification unit.

3. A gas meter system according to claim 2, further comprising a plurality of the gas meter, wherein the plant identification unit is configured to generate a gas supply map representing which of the plurality of the gas production plant produces the gas supplied to each of the plurality of the gas meter in a gas supply pipeline network in which the plurality of the gas meter and the plurality of the gas production plant are connected to each other based on the time-series change of the sound velocity of the gas, which is derived by the sound velocity derivation unit of the gas meter, to thereby identify the gas production plant supplying the gas to the gas meter based on the generated gas supply map.

4. A gas meter system according to claim 2, wherein the gas comprises a hydrocarbon gas.

5. A gas meter system according to claim 4, wherein the gas meter further comprises a flow rate derivation unit configured to derive a flow rate of a gas passing through a gas flow path, and wherein the center device further comprises a passage heating value derivation unit configured to derive a passage heating value of the gas that has passed through the gas meter based on the heating value of the gas, which is identified by the heating value derivation unit, and on the flow rate of the gas, which is derived by the flow rate derivation unit of the gas meter.

6. A gas meter system according to claim 5, wherein the gas meter further comprises a temperature sensor configured to measure a temperature of the gas flowing through the gas flow path, wherein the gas characteristic identification unit is configured to identify a gas characteristic representing a relationship among the temperature, the sound velocity, and the heating value of the gas based on the analysis result of the component of the gas produced by the gas production unit, and wherein the heating value derivation unit is configured to derive the heating value of the gas used in the gas meter based on the temperature of the gas, which is measured by the temperature sensor of the gas meter, on the sound velocity of the gas, which is derived by the sound velocity derivation unit of the gas meter, and on the gas characteristic identified by the gas characteristic identification unit of the gas production plant.

7. A gas meter system according to claim 4, wherein the gas meter further comprises a temperature sensor configured to measure a temperature of a gas flowing through a gas flow path, wherein the gas characteristic identification unit is configured to identify a gas characteristic representing a relationship among the temperature, the sound velocity, and the heating value of the gas based on the analysis result of the component of the gas produced by the gas production unit, and wherein the heating value derivation unit is configured to derive the heating value of the gas used in the gas meter based on the temperature of the gas, which is measured by the temperature sensor of the gas meter, on the sound velocity of the gas, which is derived by the sound velocity derivation unit of the gas meter, and on the gas characteristic identified by the gas characteristic identification unit of the gas production plant.

8. A gas meter system according to claim 2, wherein the gas meter further comprises a flow rate derivation unit configured to derive a flow rate of a gas passing through a gas flow path, and wherein the center device further comprises a passage heating value derivation unit configured to derive a passage heating value of the gas that has passed through the gas meter based on the heating value of the gas, which is identified by the heating value derivation unit, and on the flow rate of the gas, which is derived by the flow rate derivation unit of the gas meter.

9. A gas meter system according to claim 8, wherein the gas meter further comprises a temperature sensor configured to measure a temperature of the gas flowing through the gas flow path, wherein the gas characteristic identification unit is configured to identify a gas characteristic representing a relationship among the temperature, the sound velocity, and the heating value of the gas based on the analysis result of the component of the gas produced by the gas production unit, and wherein the heating value derivation unit is configured to derive the heating value of the gas used in the gas meter based on the temperature of the gas, which is measured by the temperature sensor of the gas meter, on the sound velocity of the gas, which is derived by the sound velocity derivation unit of the gas meter, and on the gas characteristic identified by the gas characteristic identification unit of the gas production plant.

10. A gas meter system according to claim 2, wherein the gas meter further comprises a temperature sensor configured to measure a temperature of a gas flowing through a gas flow path, wherein the gas characteristic identification unit is configured to identify a gas characteristic representing a relationship among the temperature, the sound velocity, and the heating value of the gas based on the analysis result of the component of the gas produced by the gas production unit, and wherein the heating value derivation unit is configured to derive the heating value of the gas used in the gas meter based on the temperature of the gas, which is measured by the temperature sensor of the gas meter, on the sound velocity of the gas, which is derived by the sound velocity derivation unit of the gas meter, and on the gas characteristic identified by the gas characteristic identification unit of the gas production plant.

11. A gas meter system according to claim 1, wherein the gas comprises a hydrocarbon gas.

12. A gas meter system according to claim 11, wherein the gas meter further comprises a flow rate derivation unit configured to derive a flow rate of a gas passing through a gas flow path, and wherein the center device further comprises a passage heating value derivation unit configured to derive a passage heating value of the gas that has passed through the gas meter based on the heating value of the gas, which is identified by the heating value derivation unit, and on the flow rate of the gas, which is derived by the flow rate derivation unit of the gas meter.

13. A gas meter system according to claim 12,
wherein the gas meter further comprises a temperature sensor configured to measure a temperature of the gas flowing through the gas flow path,
wherein the gas characteristic identification unit is configured to identify a gas characteristic representing a relationship among the temperature, the sound velocity, and the heating value of the gas based on the analysis result of the component of the gas produced by the gas production unit, and
wherein the heating value derivation unit is configured to derive the heating value of the gas used in the gas meter based on the temperature of the gas, which is measured by the temperature sensor of the gas meter, on the sound velocity of the gas, which is derived by the sound velocity derivation unit of the gas meter, and on the gas characteristic identified by the gas characteristic identification unit of the gas production plant.

14. A gas meter system according to claim 11,
wherein the gas meter further comprises a temperature sensor configured to measure a temperature of a gas flowing through a gas flow path,
wherein the gas characteristic identification unit is configured to identify a gas characteristic representing a relationship among the temperature, the sound velocity, and the heating value of the gas based on the analysis result of the component of the gas produced by the gas production unit, and
wherein the heating value derivation unit is configured to derive the heating value of the gas used in the gas meter based on the temperature of the gas, which is measured by the temperature sensor of the gas meter, on the sound velocity of the gas, which is derived by the sound velocity derivation unit of the gas meter, and on the gas characteristic identified by the gas characteristic identification unit of the gas production plant.

15. A gas meter system according to claim 1,
wherein the gas meter further comprises a flow rate derivation unit configured to derive a flow rate of a gas passing through a gas flow path, and
wherein the center device further comprises a passage heating value derivation unit configured to derive a passage heating value of the gas that has passed through the gas meter based on the heating value of the gas, which is identified by the heating value derivation unit, and on the flow rate of the gas, which is derived by the flow rate derivation unit of the gas meter.

16. A gas meter system according to claim 15,
wherein the gas meter further comprises a temperature sensor configured to measure a temperature of a gas flowing through a gas flow path,
wherein the gas characteristic identification unit is configured to identify a gas characteristic representing a relationship among the temperature, the sound velocity, and the heating value of the gas based on the analysis result of the component of the gas produced by the gas production unit, and
wherein the heating value derivation unit is configured to derive the heating value of the gas used in the gas meter based on the temperature of the gas, which is measured by the temperature sensor of the gas meter, on the sound velocity of the gas, which is derived by the sound velocity derivation unit of the gas meter, and on the gas characteristic identified by the gas characteristic identification unit of the gas production plant.

17. A gas meter system according to claim 1,
wherein the gas meter further comprises a temperature sensor configured to measure a temperature of a gas flowing through a gas flow path,
wherein the gas characteristic identification unit is configured to identify a gas characteristic representing a relationship among the temperature, the sound velocity, and the heating value of the gas based on the analysis result of the component of the gas produced by the gas production unit, and
wherein the heating value derivation unit is configured to derive the heating value of the gas used in the gas meter based on the temperature of the gas, which is measured by the temperature sensor of the gas meter, on the sound velocity of the gas, which is derived by the sound velocity derivation unit of the gas meter, and on the gas characteristic identified by the gas characteristic identification unit of the gas production plant.

18. A heating value derivation method for a gas meter system comprising a gas meter, a gas production plant, and a center device, the heating value derivation method comprising:
deriving, by the gas meter, a sound velocity of a gas supplied to a demand place;
producing the gas by the gas production plant;
analyzing, by a gas chromatograph, a component of the produced gas;
identifying, by the gas production plant, a gas characteristic representing a relationship between the sound velocity and a heating value of the gas based on an analysis result of the component of the produced gas; and
deriving, by the center device, the heating value of the gas used in the gas meter based on the sound velocity of the gas, which is derived by the gas meter, and on the gas characteristic identified by the gas production plant.

* * * * *